(12) United States Patent
Sakurai

(10) Patent No.: US 7,774,795 B2
(45) Date of Patent: *Aug. 10, 2010

(54) PRINTER WITH OPTIONAL DEVICE CONTROL

(75) Inventor: Toshio Sakurai, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

This patent is subject to a terminal disclaimer.

(21) Appl. No.: 11/448,884

(22) Filed: Jun. 8, 2006

(65) Prior Publication Data

US 2006/0227361 A1 Oct. 12, 2006

Related U.S. Application Data

(62) Division of application No. 09/715,109, filed on Nov. 20, 2000, now abandoned, which is a division of application No. 09/301,581, filed on Apr. 29, 1999, now Pat. No. 6,210,051, and a division of application No. 08/786,992, filed on Jan. 23, 1997, now Pat. No. 5,924,802.

(30) Foreign Application Priority Data

| Jan. 29, 1996 | (JP) | ................................. 8-012624 |
| Jan. 14, 1997 | (JP) | ................................. 9-004699 |

(51) Int. Cl.
- G06F 9/44 (2006.01)
- B41J 5/30 (2006.01)
- B41J 5/40 (2006.01)
- B41J 29/02 (2006.01)

(52) U.S. Cl. ........................... 719/327; 400/61; 400/76; 400/692

(58) Field of Classification Search ................. 719/310, 719/327; 707/100; 400/61, 62, 70, 76; 399/13; 710/8, 104
See application file for complete search history.

(56) References Cited

U.S. PATENT DOCUMENTS 4,763,281 A 8/1988 Arakawa .................... 400/61

(Continued)

FOREIGN PATENT DOCUMENTS

EP 0521673 1/1993

(Continued)

OTHER PUBLICATIONS

M. Tischer, "PC Intern", Dusseldorf, 1995, p. 1-10.

(Continued)

*Primary Examiner*—Van H Nguyen
(74) *Attorney, Agent, or Firm*—Fitzpatrick, Cella, Harper & Scinto

(57) ABSTRACT

A printer receives image information from a host computer and performs printing based on the image information. When an optional unit is newly attached to the printer, the printer changes the device ID which is selected from an ID ROM in accordance with the optional unit. Then output from an interface circuit is changed so that the host computer detects the change of the output from the interface circuit. The host computer makes a device-ID request to the printer to obtain the device ID corresponding to the optional device. Then the host computer determines whether or not a printer driver which is currently operative corresponds to the printer with the newly-attached optional device.

22 Claims, 10 Drawing Sheets

U.S. PATENT DOCUMENTS

| | | | |
|---|---|---|---|
| 4,902,146 A | 2/1990 | Ishikawa | 400/692 |
| 4,924,320 A | 5/1990 | Tanaka et al. | 358/296 |
| 4,996,539 A | 2/1991 | Haraga | 101/66 |
| 4,996,562 A | 2/1991 | Mizude | 355/205 |
| 5,052,830 A | 10/1991 | Gohara | 400/692 |
| 5,092,686 A | 3/1992 | Tsukamoto | 400/692 |
| 5,095,371 A | 3/1992 | Tanaka et al. | 358/300 |
| 5,124,809 A | 6/1992 | Koishikawa | 358/205 |
| 5,126,786 A | 6/1992 | Tanaka | 355/46 |
| 5,171,092 A | 12/1992 | Tasaki | 400/692 |
| 5,228,118 A | 7/1993 | Sasaki | 395/112 |
| 5,242,230 A | 9/1993 | Arakawa | 400/692 |
| 5,288,155 A | 2/1994 | Suzuki | 400/83 |
| 5,318,370 A | 6/1994 | Nehowig | 400/692 |
| 5,365,311 A | 11/1994 | Matsuoka | 355/205 |
| 5,467,434 A | 11/1995 | Hower, Jr. et al. | 395/114 |
| 5,530,872 A * | 6/1996 | Smeltzer et al. | 710/260 |
| 5,548,759 A | 8/1996 | Lipe | 707/100 |
| 5,580,177 A | 12/1996 | Gase et al. | 400/61 |
| 5,590,871 A | 1/1997 | Okabe et al. | |
| 5,604,843 A | 2/1997 | Shaw et al. | 395/101 |
| 5,748,980 A | 5/1998 | Lipe | 710/8 |
| 5,768,487 A * | 6/1998 | LeClair et al. | 358/1.17 |
| 5,768,516 A | 6/1998 | Sugishima | |
| 5,784,555 A * | 7/1998 | Stone | 709/220 |
| 5,924,802 A | 7/1999 | Sakurai | 400/61 |
| 6,009,480 A | 12/1999 | Pleso | 710/8 |
| 6,281,979 B1 | 8/2001 | Atobe et al. | |

FOREIGN PATENT DOCUMENTS

| | | |
|---|---|---|
| EP | 0575172 | 12/1993 |
| EP | 0 602 667 | 6/1994 |
| JP | 1311351 | 12/1989 |
| JP | 3-74716 | 3/1991 |
| JP | 69378 | 3/1991 |
| JP | 3-110184 A1 | 5/1991 |
| JP | 511943 | 1/1993 |
| JP | 5-105319 | 4/1993 |
| JP | 5-204565 | 8/1993 |
| JP | 6-4233 | 1/1994 |
| JP | 6-110269 | 4/1994 |
| JP | 6-179564 | 6/1994 |
| JP | 6-282501 | 10/1994 |
| JP | 6-305599 | 11/1994 |
| JP | 7-009703 | 1/1995 |
| JP | 7-028362 | 1/1995 |
| JP | 764735 | 3/1995 |
| JP | 7-172004 | 7/1995 |
| JP | 7-200459 | 8/1995 |
| JP | 7-228018 | 8/1995 |
| JP | 7-228401 | 8/1995 |
| JP | 7-242362 | 9/1995 |
| JP | 7-252018 | 10/1995 |
| JP | 7-256945 | 10/1995 |
| JP | 7-285728 | 10/1995 |
| JP | 7-287679 | 10/1995 |
| JP | 7-295915 | 11/1995 |
| JP | 7-302178 | 11/1995 |
| JP | 7-304526 | 11/1995 |
| JP | 7-311663 | 11/1995 |
| JP | 7-315595 | 12/1995 |
| JP | 7-329391 | 12/1995 |
| JP | 8-244316 | 9/1996 |
| JP | 8-293947 | 11/1996 |
| JP | 9-267538 | 10/1997 |
| JP | 9-272233 | 10/1997 |

OTHER PUBLICATIONS

IBM, "Fachausdrucke der Informationsverarbeitung, Worterbuch und Glossar", Nordlingen, 1985, p. 684.

C. Sippi, "Microcomputer Dictionary" Indianapolis, Second edition, 1981, p. 335-336.

IBM Nederland N.V., "Computerterminologie", Amsterdam, 1975, p. 93.

Statement of Grounds of Appeal, dated Aug. 17, 2007, against decision of Opposition Division in EP 0 786 736.

Office Action dated Aug. 17, 2007 in JP 2006168126.

Patent Abstracts of Japan, vol. 14, No. 335 (M-1000), Jul. 19, 1990 & JP 2-116577 (NEC Corp.), May 1, 1990.

Appeal Decision in JP 2006-10061.

IEEE Std. 1284-1994, Dec. 2, 1994.

Reason for Refusal dated Nov. 1, 2005 in JP Application No. 9-004699.

Decision for Refusal dated Apr. 11, 2006 in JP Application No. 9-004699.

Pre-Appeal Reexamination Report dated Sep. 5, 2006 in JP Application No. 9-004699.

Plaintiffs Preliminary Statement (1) dated Oct. 29, 2008 in JP Application No. 9-004699.

Defendant's Preliminary Statement (1) dated Dec. 10, 2008 in JP Application No. 9-004699.

Defendant's Preliminary Statement (2) dated Feb. 2, 2009 in JP Application No. 9-004699.

* cited by examiner

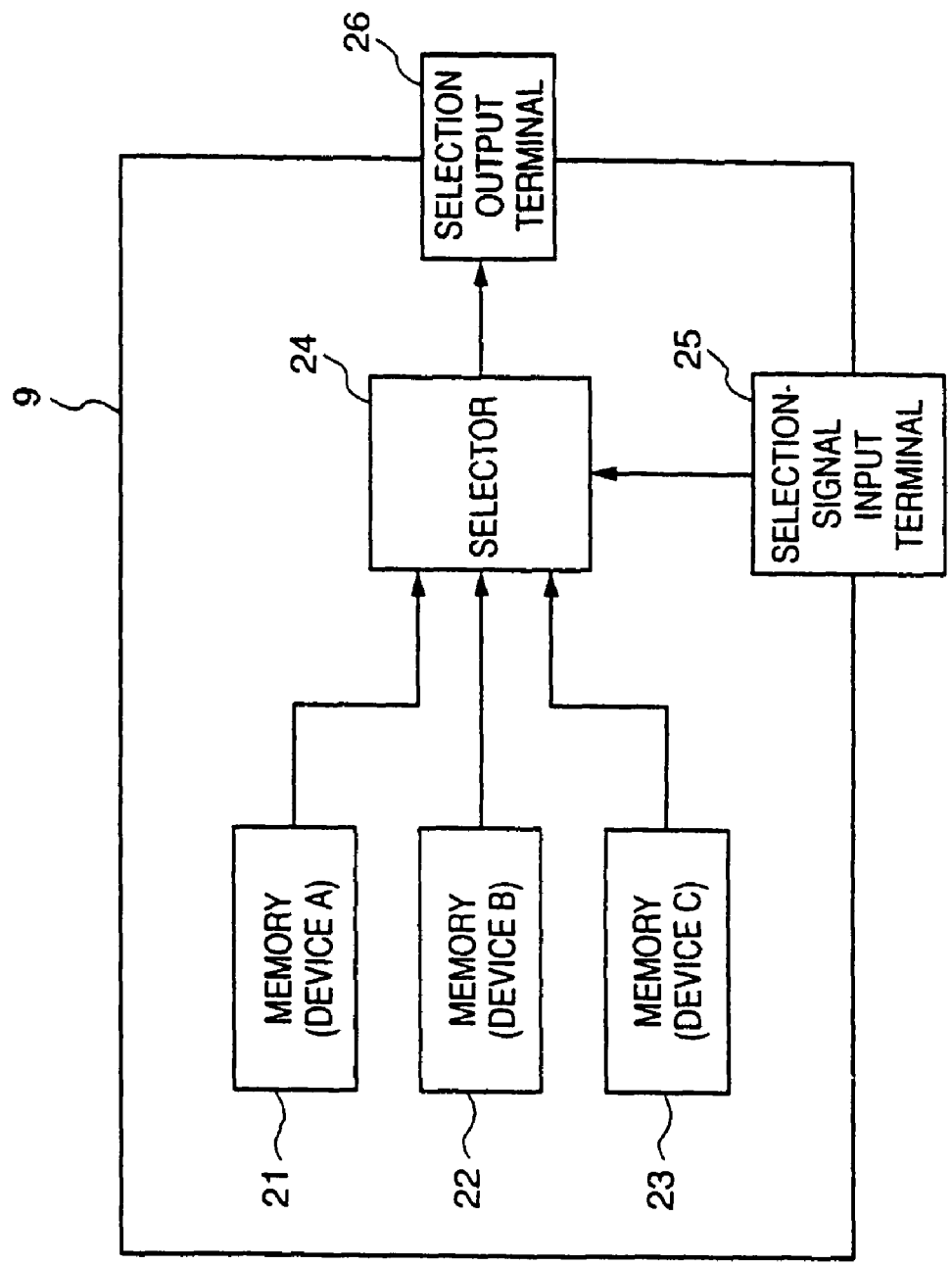

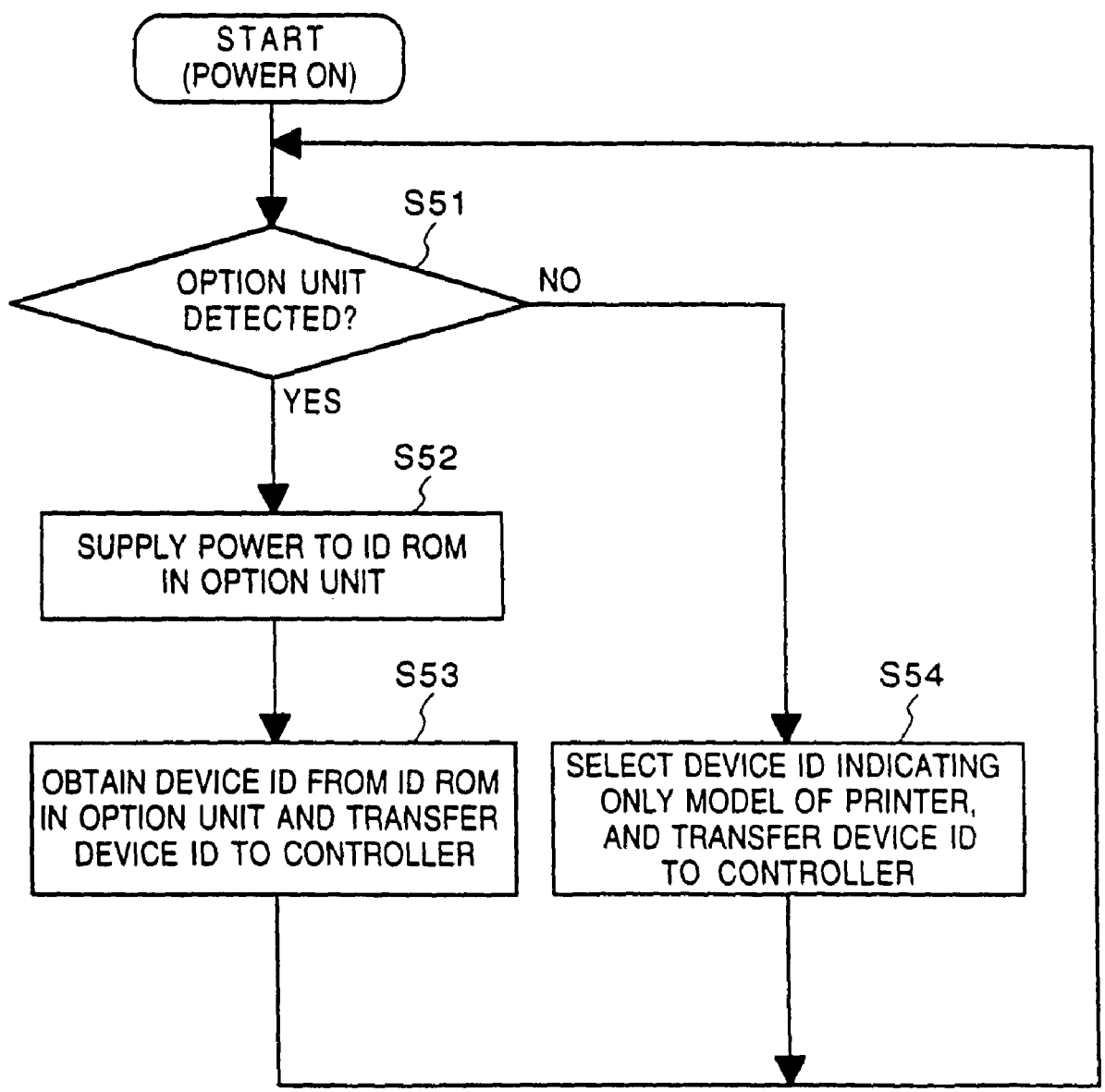

PRINTER WITH OPTIONAL DEVICE CONTROL

This application is a divisional application of application Ser. No. 09/715,109, filed Nov. 20, 2000 (now abandoned), which was a divisional application of application Ser. No. 09/301,581, filed Apr. 29, 1999 (now U.S. Pat. No. 6,210, 051), which was a divisional of application Ser. No. 08/786, 992, filed Jan. 23, 1997 (now U.S. Pat. No. 5,924,802), all of which are incorporated herein by reference.

BACKGROUND OF THE INVENTION

This invention relates to a printer which performs printing based on image information obtained from an information processing apparatus and a control method for the printer and, more particularly to a printer, to which an optional device can be attached, and a control method for the printer.

Recently, a printer, which has a simplified construction and which performs various operations by control of software programs which run on a host computer, has been put into practical use as so-called host-base printer. In this system, various printer operations are controlled via a printer driver in the host computer, by bidirectional communication between the printer and the host computer.

Upon starting print operation, the printer driver installed in the host computer determines whether or not it supports the printer connected to the host computer. In this system, to attach an optional device to the printer, it is necessary that the printer driver has capability to communicate with the optional device. For example, if an optional device of the printer is a postcard feeder, the capability of the printer driver must include the card feeder function.

Accordingly, in a case where a new optional function not supported by the printer driver is employed, a revised printer driver is included in a package upon shipment. When the new optional function is installed, the previous printer driver is replaced by the revised printer driver.

However, the above conventional technique has the following problem.

Conventionally, the host computer uses one device ID to recognize the printer regardless of option-device setting (i.e., attached or not) status of the printer. More specifically, the host computer recognizes a printer having a newly-attached optional device with the same ID as that used to recognize the printer before the optional device is attached to the printer. Accordingly, the host computer cannot detect whether or not the optional device has been attached to the printer. If a printer, to which an optional function is attached, is connected to the host computer but the host computer system is not updated to include the new function, the printer might perform erroneous operation. Similarly, when a printer, to which no optional device is attached, is connected to the host computer but the host computer system has been updated to include the new function of the printer driver, the printer might perform erroneous operation.

SUMMARY OF THE INVENTION

The present invention has been made in consideration of the above situation, and has its object to solve the above problem, to provide a printing system in which a printer and an information processing apparatus are connected.

According to the present invention, the foregoing object is attained by providing a printer which inputs print information from an information processing apparatus connected to the printer and performs print processing based on the print information, comprising: holding means for holding identification information on option-device setting status of the printer, the identification information being readable by the information processing apparatus; change means for changing the identification information held in the holding means in accordance with attachment status of an optional device for expanding function of the printer; and identification-information output means for outputting the identification information held in the holding means, in correspondence with a request from the information processing apparatus.

Preferably, the above printer further comprises request causing means for causing the information processing apparatus to issue an identification-information request to the printer when the optional device has been attached to the printer.

Preferably, the optional device has memory means for storing the identification information of the optional device.

Preferably, the information processing apparatus further comprises driver-change means for changing a driver for the printer in accordance with the identification information outputted from the printer.

Preferably, the optional device has a barcode corresponding to the identification information of the optional device.

Further, the foregoing object is attained by providing a printing method for a printer which inputs print information from an information processing apparatus connected to the printer and performs print processing based on the print information, comprising: a holding step of holding identification information on option-device setting status of the printer, the identification information being readable by the information processing apparatus; a change step of changing the identification information held at the holding step in accordance with attachment status of an optional device for expanding function of the printer; and an identification-information output step of outputting the identification information held at the holding step, in correspondence with a request from the information processing apparatus.

Preferably, the above printing method further comprises a request causing step of causing the information processing apparatus to issue an identification-information request to the printer when the optional device has been attached to the printer.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram showing the general construction of an ID ROM 9 in FIG. 1;

FIG. 9 is a flowchart showing the device-ID selection by the printer of the second embodiment.

DETAILED DESCRIPTION OF THE PREFERRED EMBODIMENTS

Preferred embodiments of the present invention will now be described in detail in accordance with the accompanying drawings.

First Embodiment

Figure 1:
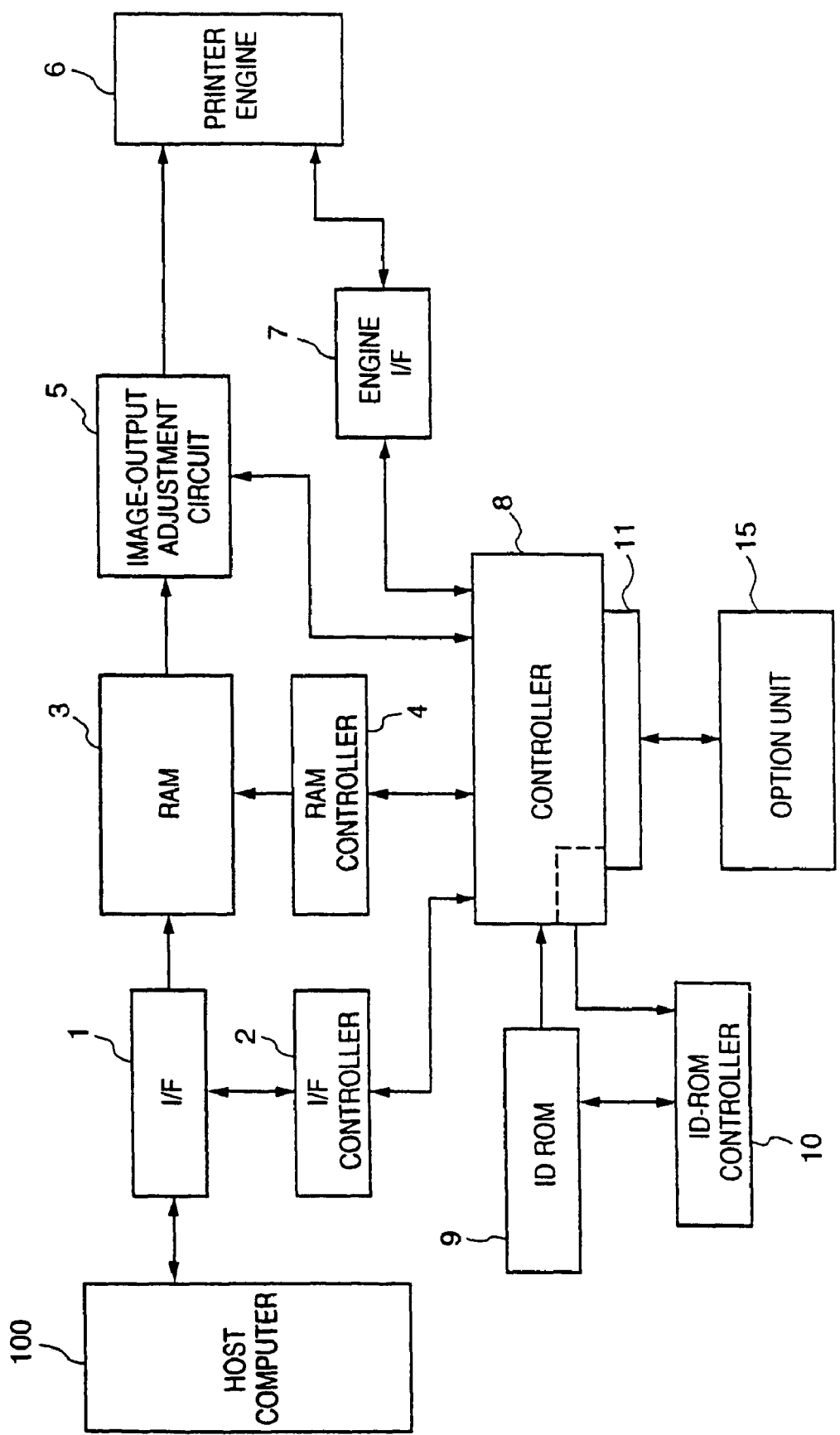
FIG. 1 is a block diagram showing the construction of a printer according to a first embodiment of the present invention.

FIG. 1 shows the construction of a printer according to a first embodiment of the present invention. In FIG. 1, reference numeral 1 denotes an interface (I/F) circuit which is connected to a host computer 100, an external device, which controls the printer, for bidirectional communication between the printer and the host computer; 2, an I/F controller for controlling the I/F circuit 1; 3, a RAM; 4, a RAM controller for storage control of the RAM 3; 5, an image-output adjustment circuit for outputting print data from the RAM 3 in correspondence with output timing of a printer engine 6; and 7, an engine I/F circuit for controlling the printer engine 6 under the control of a controller 8.

The controller 8 controls the overall printer of the present embodiment. Numeral 9 denotes an ID ROM holding device IDs of the printer, to be described later; 10, an ID-ROM controller for selecting a device ID to be outputted from the ID ROM 9 into the controller 8, as described later; and 11, an attachment unit for attaching an option unit 15 to the printer. The option unit 15 includes various devices attachable to the printer such as an automatic document feeder (ADF), a sorter, a double-sided printing unit, a paper cassette, a finisher, and a scanner.

The I/F controller 2 is connected to the I/F circuit 1 with a control signal via a control signal line. Also, the I/F circuit 1 is connected to the RAM 3. When image information is received from the host computer 100, the I/F controller 2 controls the I/F circuit 1 to output the image information to the RAM 3.

The image information received from the host computer is temporarily stored in the RAM 3. The RAM controller 4, connected to the RAM 3, controls the read/write operation with respect to the RAM 3. The image information stored in the RAM 3 is transferred to the image-output adjustment circuit 5, and outputted to the printer engine 6, in synchronization with output timing of the printer engine 6.

The printer engine 6 prints an image on a print medium based on the input image information. The printer engine 6 is connected to the engine I/F circuit 7. The engine I/F circuit 7 sends a control command to the printer engine 6, or receives from the printer engine 6 a status signal indicating operation status of the printer engine 6.

The I/F controller 2, the RAM controller 4, the image-output adjustment circuit 5 and the engine I/F circuit 7 are connected to the controller 8. The controller 8 is connected to the ID ROM 9 in which a plurality of device IDs of the printer are stored. The ID-ROM controller 10 selects one of the device ID's in the ID ROM 9, and outputs the selected device ID into the controller 8. When the host computer 100 makes a device-ID request to the printer via the I/F circuit 1, the selected device ID is read from the controller 8 and outputted to the host computer 100.

After the power of the printer has been turned on, the ID-ROM controller 10 detects whether or not the option unit 15 is attached to the attachment unit 11, at predetermined periods. When the ID-ROM controller 10 detects that the option unit 15 is attached to the attachment unit 11, the ID-ROM controller 10 can discriminate the type of the option unit 15. The ID-ROM controller 10 selects a device ID to be outputted to the controller 8 from the device IDs stored in the ID ROM 9, in accordance with the type of the option unit 15.

FIG. 2 shows the general construction of the ID ROM 9 of the present embodiment. In this embodiment, the ID ROM 9 contains three device IDs. Note that in the following description, the three device IDs are stored in the ID ROM 9, however, the present invention is not limited to this number of device IDs. The number of device IDs can be changed in accordance with the number of optional devices which may be connected to the printer.

In FIG. 2, numeral 21 denotes a memory in which a device ID corresponding to a device A is stored; 22, a memory in which a device ID corresponding to a device B is stored; 23, a memory in which a device ID corresponding to a device C is stored; and 24, a selector for selecting one of the memories 21 to 23. The memories 21 to 23 are connected to the selector 24. The selector 24 selects one of outputs from the memories 21 to 23, in accordance with a selection signal from a selection-signal input terminal 25, and outputs the selected memory content through a selection output terminal 26. Note that the device IDs stored in the memories 21 to 23 are information on the model of the printer and optional devices connected to the printer. Further, a device ID only indicative of the model of the printer is also stored in the ID ROM 9.

In the present embodiment, when the option unit 15 is attached to the attachment unit 11 of the printer, the ID-ROM controller 10 detects the connection between the option unit 15 and the attachment unit 11. Then the ID-ROM controller 10 outputs a selection signal into the ID ROM 9 to read the device ID of the printer, in accordance with the type of the option unit 15. The ID ROM 9 is controlled by the selector based on the selection signal, to output a new device ID by the selection-output terminal 26 to the controller 8.

Figure 4:
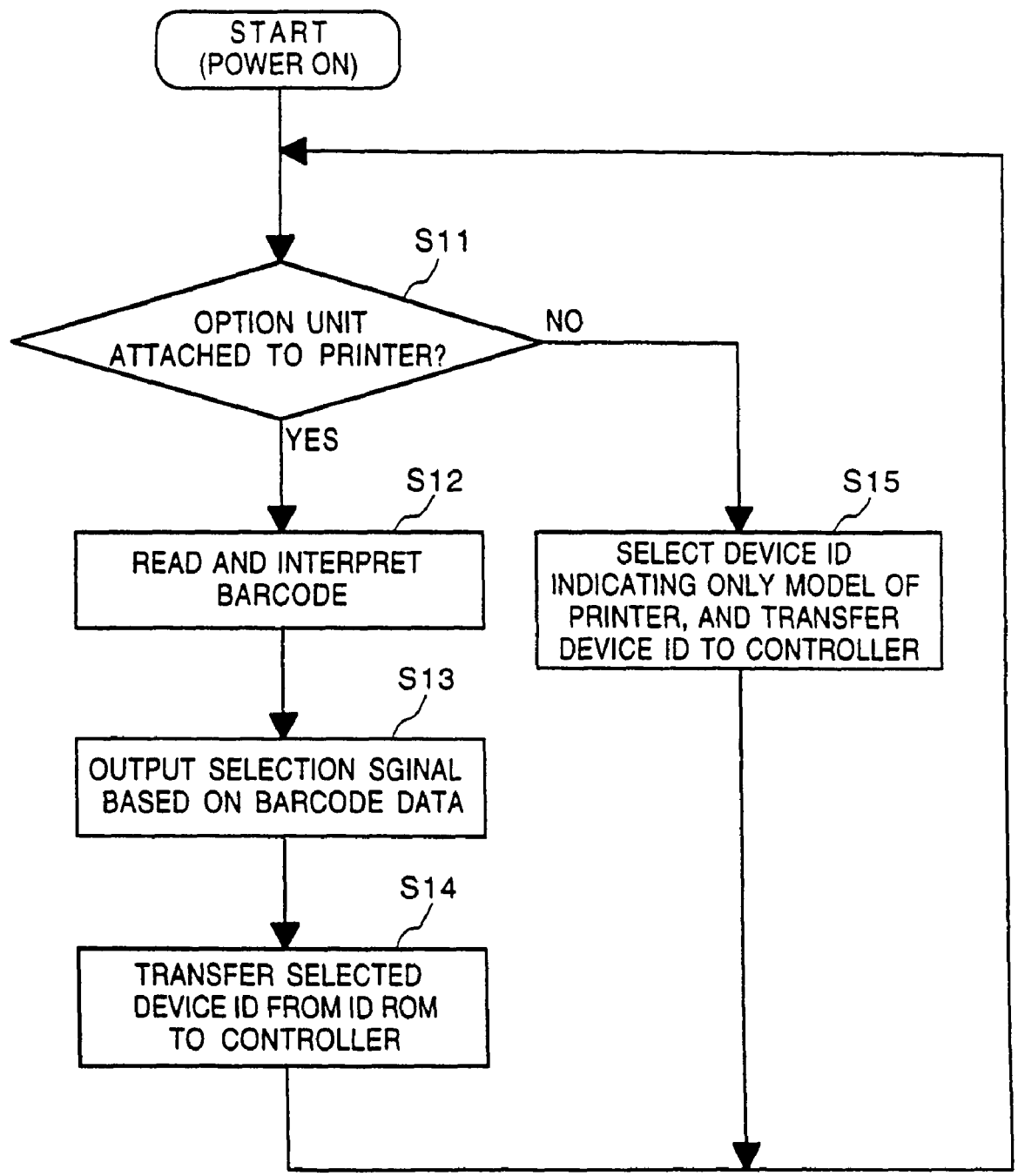
FIG. 4 is a flowchart showing device-ID selection by the printer of the first embodiment.

The host computer 100 reads the device ID from the controller 8 by processing as shown in FIG. 4 to be described later.

Next, detection of the option unit 15 attached to the printer, according to the first embodiment, will be described with reference to FIGS. 3A and 3B.

Figure 3A:
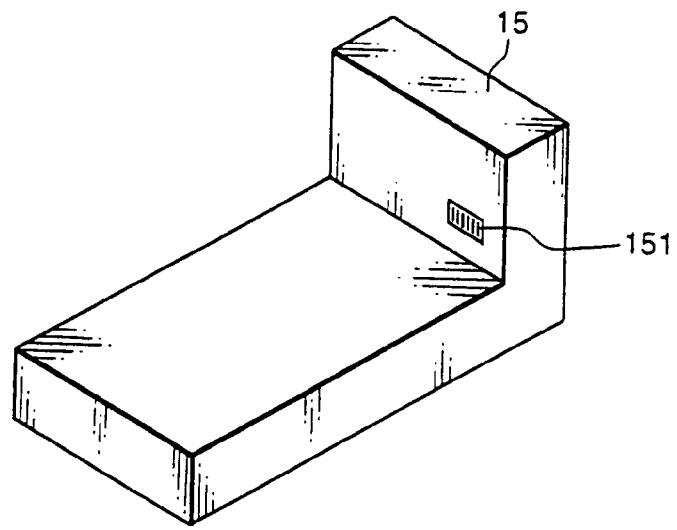
FIG. 3A is a perspective view showing an option unit of the first embodiment.
Figure 3B:
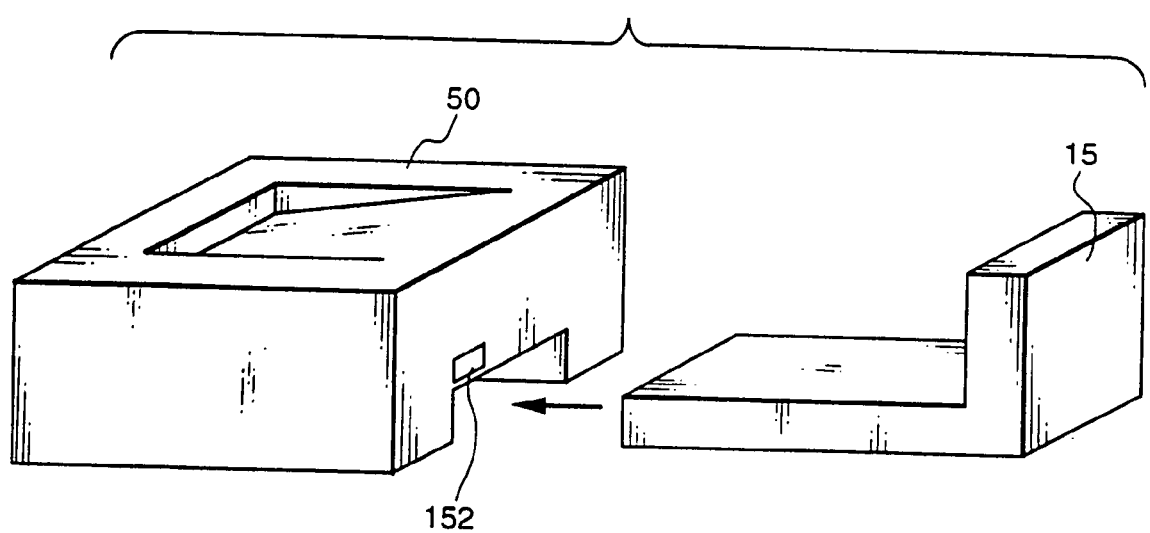
FIG. 3B is a perspective view explaining attachment of the option unit to the printer of the first embodiment.

FIG. 3A is a perspective view showing the option unit 15. FIG. 3B is a perspective view explaining attachment of the option unit 15 to the printer.

As shown in FIG. 3A, the option unit 15 is provided in advance with a barcode label 151 indicative of the device ID of the option unit 15. As shown in FIG. 3B, a printer 50 of the present embodiment has a barcode reader 152 at the attachment unit 11. FIG. 4 shows device-ID selection in accordance with the device ID of the option unit 15 having the above construction, performed by the printer 50 having the above construction.

FIG. 4 is a flowchart showing device-ID selection by the printer of the first embodiment.

When the power of the printer 50 is turned on and the process starts, the ID-ROM controller 10 detects whether or not the option unit 15 has been attached to the attachment unit 11 (step S11). If it is YES, i.e., it is detected at step S11 that the option unit 15 has been attached to the printer 50 via the attachment unit 11, the ID-ROM controller 10 reads the barcode label 151 by using the barcode reader 152, and interprets the obtained barcode (step S12). The ID-ROM controller 10 outputs a selection signal to the ID ROM 9 in accordance with barcode data obtained by interpretation of the read barcode (step S13), the ID ROM 9 outputs a device ID corresponding to the selection signal to the controller 8 (step S14). On the other hand, if it is detected at step S11 that the option unit 15 has not been attached to the attachment unit 11 when or after the power of the printer has been turned on, the reading of barcode is attempted a predetermined number of times. In this case, as no barcode is read, it is determined that the option unit 15 has not been attached to the attachment unit 11, and a device ID only indicative of the model of the printer 50 is selected from the ID ROM 9 (step S15). The above processing is repeated at predetermined intervals.

When the host computer 100 makes a device-ID request regarding the optional-device setting status of the printer 50, the controller 8 transmits the device ID outputted from the ID ROM 9 to the host computer 100.

Note that in the ID ROM 9, selection by the selector 24 may be performed by an operator, from a control panel (not shown) of the printer.

Thus, if the ID-ROM controller 10 detects that an optional device is attached to the printer, and the controller 8 determines the attachment of option function by a device ID from the ID ROM 9, the controller 8 instructs the I/F controller 2 to control the output from the I/F circuit 1 so as to reset the power of the printer. As a result, the host computer 100 performs initialization to be described later on the printer. In the initialization, the device ID of the printer is read so that the host computer 100 obtains the device ID of the printer, when the optional function has been newly set, indicative of the type of the newly-attached optional device. Thus, the host computer 100 can obtain the device ID of the optional device newly attached to the printer before print-output operation is performed, and determine whether or not the printer driver currently connected to the host computer supports the newly-attached optional device.

Note that the present invention is not limited to the reading of the device ID by the host computer 100 as above. It may be arranged such that the output from the I/F circuit 1 is controlled so as to disconnect and re-connect the communication link between the printer and the host computer. In this case, the host computer 100 also performs initialization on the printer, where the device ID of the printer is read, so that the host computer 100 receives the device ID indicating the model of the printer and the type of the newly-attached optional device.

Figure 5:
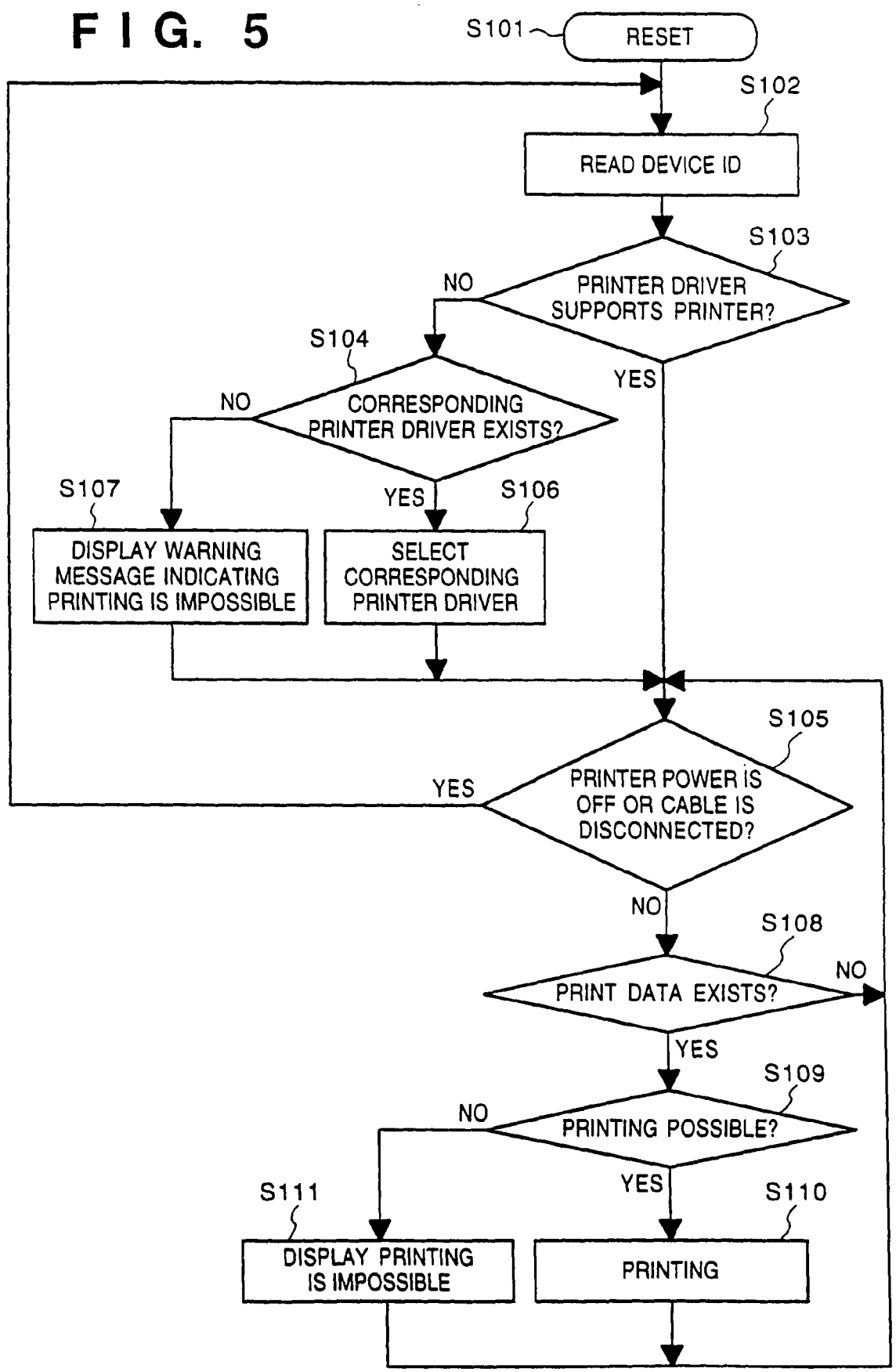
FIG. 5 is a flowchart showing printer-driver selection based on a device ID of the printer and print control by a host computer 100 of the first embodiment.

Next, printer control on the host computer side in a case where the option-device setting status of the printer is changed will be described with reference to the flowchart of FIG. 5. FIG. 5 shows an algorithm for printer-driver selection by the host computer 100 based on the device ID of the printer. The host computer 100 of the present embodiment executes this processing when the power of the host computer is turned on or when the system is reset. Note that the processing may be performed as an interrupt processing when the host computer 100 issues a device-ID request to the printer.

When the power of the host computer 100 is turned on or the system is reset, resetting is performed at step S101. Next, at step S102, the device ID of the printer is read from the printer, and the option-device setting status of the printer is examined. At step S103, it is determined whether or not the printer driver, which is currently in the host computer 100, supports the currently-connected printer, based on the device ID read at step S102. If it is determined that the printer driver supports the printer, the process proceeds to step S105, at which, to confirm whether or not the status of the printer has changed after step S102, it is determined whether or not the power of the printer is on, or the connection cable between the printer and the host computer is normally connected. If it is determined that the power of the printer is off or the cable is disconnected, the process returns to step S102, to perform the reading the device ID of the printer again.

On the other hand, if it is determined at step S105 that the power of the printer is on and the connection cable is normally connected, the process proceeds to step S108, at which it is determined whether or not print data exists. If there is no print data, the process returns to step S105, to repeat checking the power on/off status and the connected/disconnected status of the cable of the printer.

On the other hand, if it is determined at step S108 that print data exists, the process proceeds to step S109, at which it is determined whether or not the overall system including the host computer 100 and the printer is in print-possible status. If YES, the process proceeds to step S110, at which print data is transferred to the printer for print-output. Then the process returns to step S105.

On the other hand, if it is determined at step S109 that the overall system is not in print-possible status (including status where an appropriate printer driver is not operative), the process proceeds to step S111, at which the host computer 100 displays an warning message to inform an operator that printing is impossible. Then the process returns to step S105.

Further, at step S103, if it is determined as a result of examination of the read device ID that the printer corresponding to the device ID is not supported by the printer driver currently operative in the host computer 100, the process proceeds to step S104, at which it is determined whether or not a printer driver corresponding to the device ID, which the host computer 100 can read and activate, exists in an external storage device such as a hard disk, or already exists in the memory of the host computer 100. If it is determined that the printer driver exists, the process proceeds to step S106, at which the printer driver is read into the memory, for example, in accordance with necessity, and the printer driver is made active in the memory. Then the process proceeds to step S105.

On the other hand, if it is determined that the printer driver corresponding to the printer does not exist, the process proceeds to step S107, at which an warning message is displayed to inform the operator that printing is impossible, similar to step S111. Then the process proceeds to step S105.

Note that on the host computer side, acquisition of device ID is performed when the power of the host computer 100 is turned on, or when the system is reset, or when the status of the printer is changed, or by polling the printer at predetermined periods.

As described above, according to the present embodiment, when an optional device is attached to the printer, the printer changes its device ID, and changes the output from the I/F to the host computer. The host computer detects the change of the output from the I/F circuit, and makes a device-ID request to the printer. Then the host computer reads the new device ID, selects a printer driver corresponding to the optional device of the printer, based on the read device ID, and performs printing. When the printer driver is inappropriate for the printer, the above processing prevents printing by using the inappropriate printer driver, thus avoiding undesired print result. Further, this effectively prevents various inconveniences caused in printing with an inappropriate printer driver.

In the present embodiment, especially when plural types of optional devices are attached to the printer, device IDs corresponding to attachment statuses of the respective optional devices can be prepared in advance, and an appropriate device ID can be outputted to the host computer.

Second Embodiment

In the first embodiment, device IDs corresponding to all the optional devices which are attachable to the printer are stored in the ID ROM 9 of the printer, and a device ID corresponding to the optional-device setting status of the printer is selected and supplied to the controller 8. However, the present invention is not limited to this arrangement. For example, it may be arranged such that device IDs corresponding to attachment statuses of the optional devices are respectively stored in the optional devices, and when the optional device is attached to the printer, the device ID is read from the optional device. This construction will be described as a second embodiment with reference to FIGS. 6 to 9.

Figure 6:
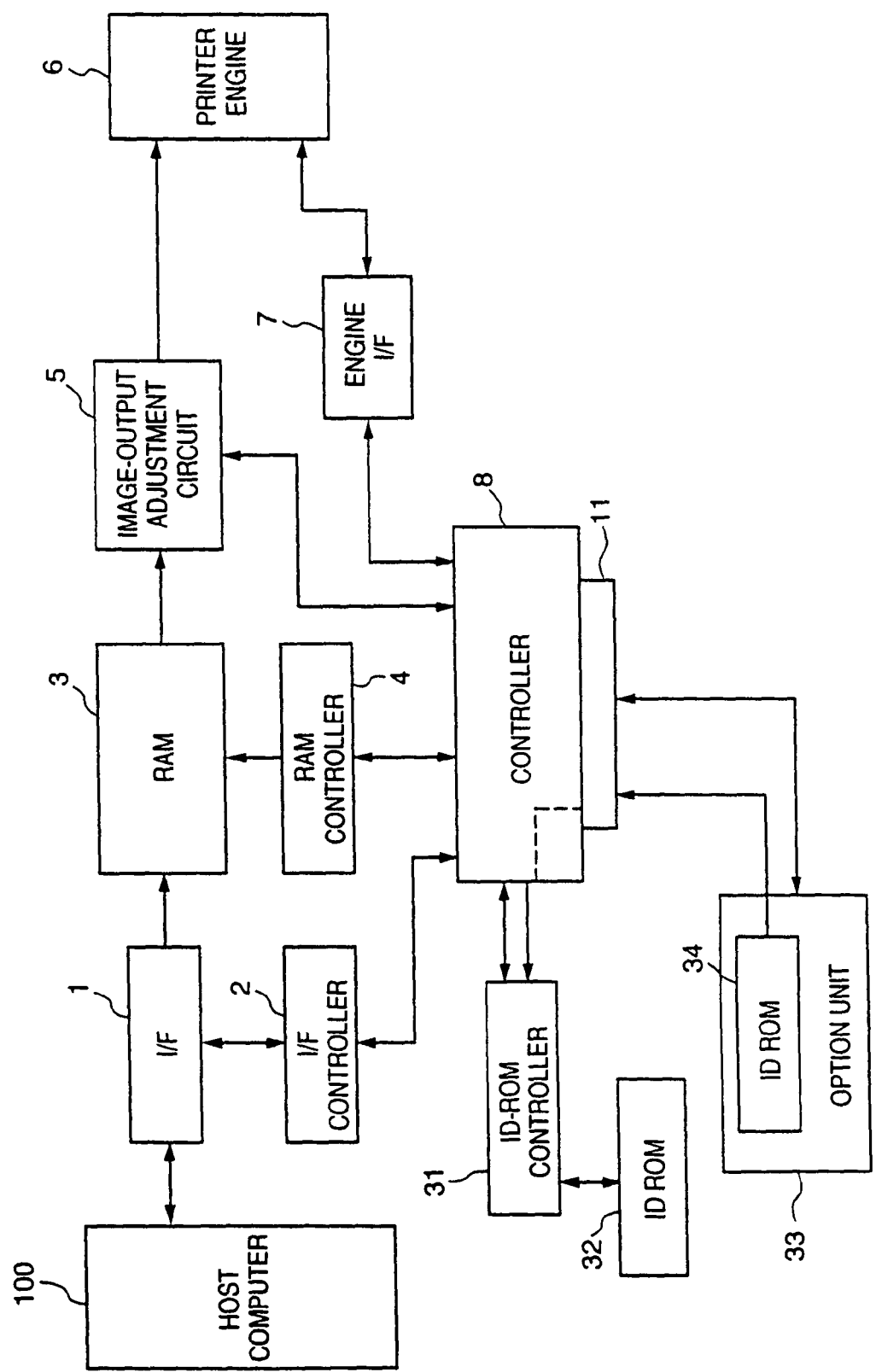
FIG. 6 is a block diagram showing the construction of the printer according to a second embodiment of the present invention.
Figure 7:
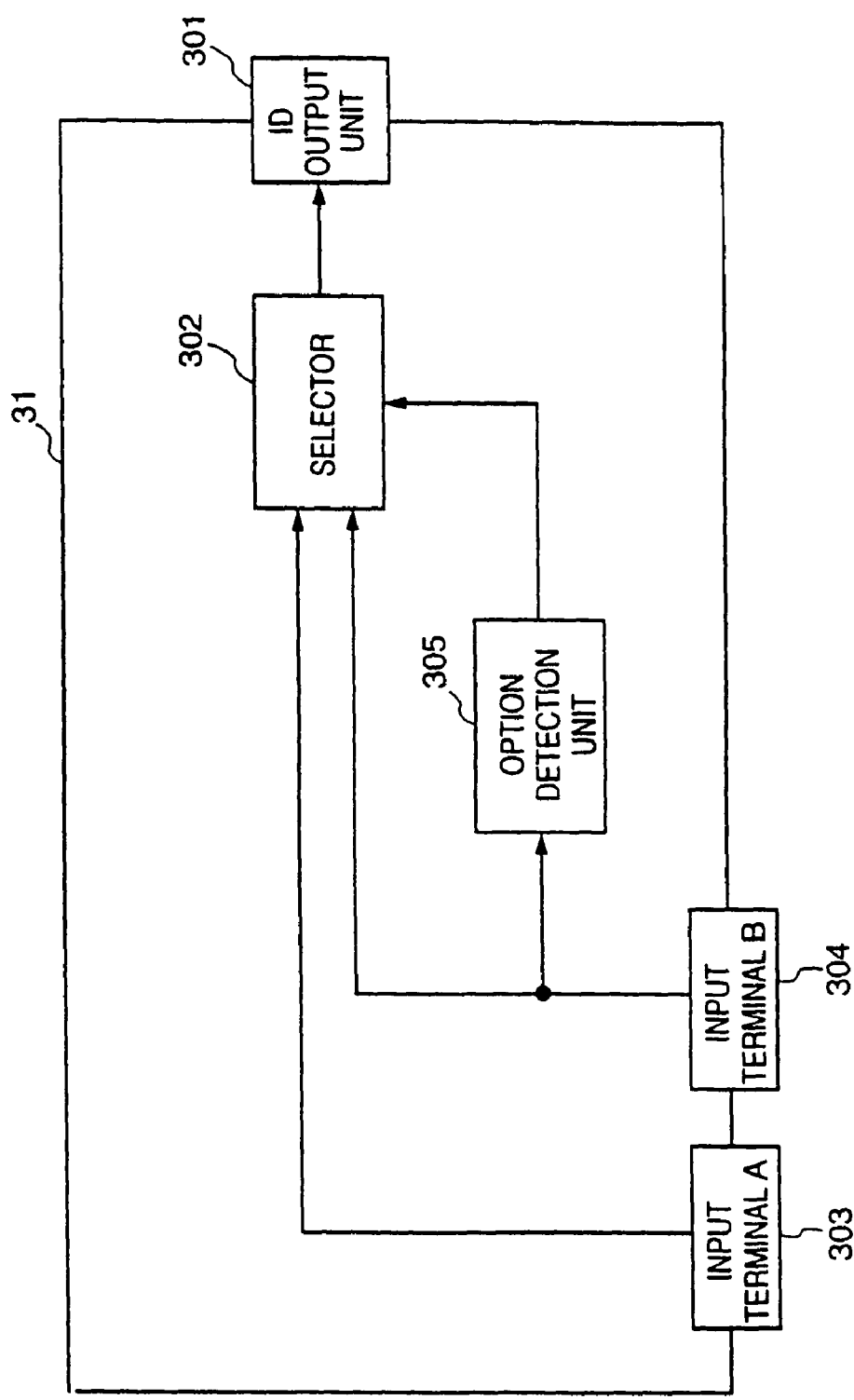
FIG. 7 is a block diagram showing the detailed construction of an ID-ROM controller 31 in FIG. 6.

FIG. 6 shows the construction of the printer according to the second embodiment of the present invention. FIG. 7 shows the detailed construction of an ID-ROM controller 31 in FIG. 6.

In FIGS. 6 and 7, the elements corresponding to those in FIGS. 1 and 2 have the same reference numerals, and the explanation of those elements will be omitted. In the second embodiment, the ID-ROM controller 31 reads a device ID indicative of the model of the printer, from an ID ROM 32 in the printer, or reads a device ID indicative of an option unit 33, from an ID ROM 34 in the option unit 33 when attached to the printer. When the option unit 33 is attached to the printer, the ID-ROM controller 31 outputs the content of the ID ROM 34 to the controller 8. When the option unit 33 is not attached to the printer, the ID-ROM controller 31 outputs the content of the ID ROM 32 to the controller 8.

In FIG. 7, numeral 301 denotes an ID output unit; 302, a selector for switching outputs from the ID ROM 32 in the printer and the ID ROM 34 in the option unit 33; 303, an input terminal A for inputting the output from the ID ROM 32 to the selector 302; 304, an input terminal B for inputting the output from the ID ROM 34 to the selector 302; and 305, an option detection unit for detecting that the option unit 33 is attached to the printer. The output from the option detection unit 305 is inputted into an input terminal of the selector 302. When the option unit 33 is connected to the printer, the input B, i.e., the output from the ID ROM 34 in the option unit 33 is selected.

In the second embodiment, the option unit 33 includes various optional devices each having the ID ROM 34 in which a device ID of the device is stored.

Next, the detection of the option unit 33 by the ID-ROM controller 31 will be described.

Figure 8A:
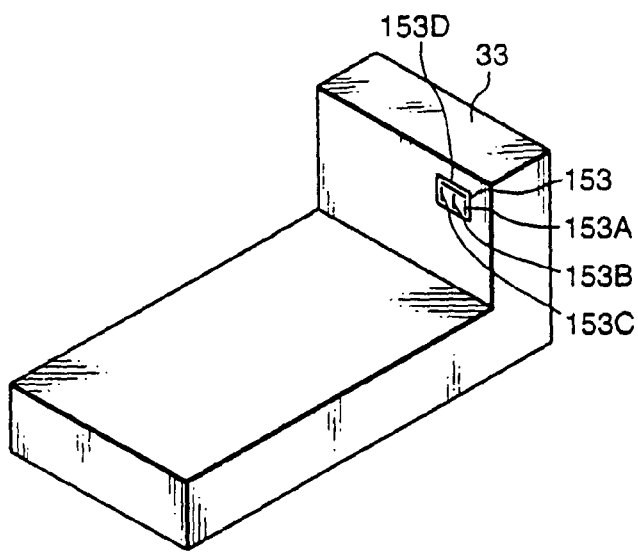
FIG. 8A is a perspective view showing an option unit of the second embodiment.
Figure 8B:
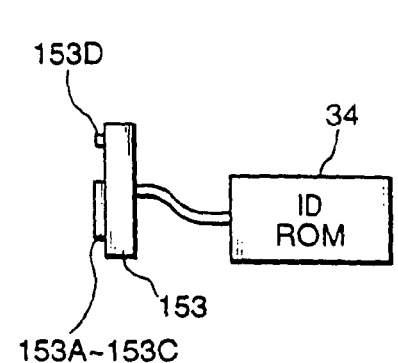
FIG. 8B is a schematic view showing a connection between an electrical contact point 153 and an ID ROM 34 in the option unit 33 of FIG. 8A.
Figure 8C:
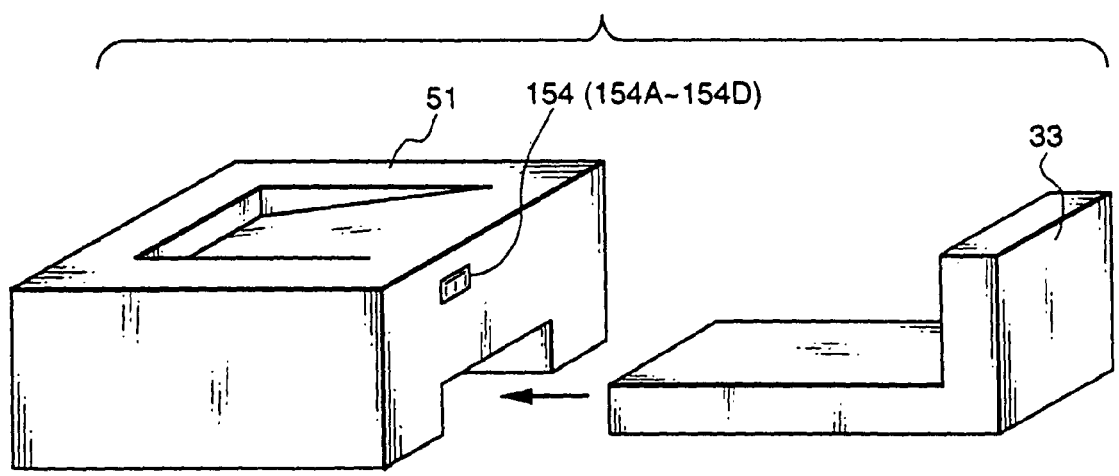
FIG. 8c is a perspective view explaining attachment of the option unit to the printer of the second embodiment.

FIG. 8A is a perspective view showing the option unit 33. FIG. 8B is a schematic view showing connection between an electrical contact point 153 and the ID ROM 34 in the option unit 33. FIG. 8c is a perspective view for explaining the attachment of the option unit 33 to the printer of the second embodiment.

As shown in FIGS. 8A to 8C, the option unit 33 has an electrical contact point 153. The electrical contact point 153 has a power-supply terminal 153A for receiving electric power from a printer 51 of the second embodiment, an output terminal 153B for outputting the content of the ID ROM 34 in the option unit 33, a control terminal 153C for controlling the ID ROM 34 from the ID ROM controller 31 in the printer 51, and a GND (ground) terminal 153D. As shown in FIG. 8C, the printer 51 has an electrical contact point 154 having terminals 154A to 154D corresponding to the terminals 153A to 153D of the electrical contact point 153.

Next, device-ID selection by the printer and option unit having the above constructions will be described with reference to the flowchart of FIG. 9.

Similar to the first embodiment, when the power of the printer 51 is turned on, it is detected whether or not the option unit 33 has been attached to the attachment unit 11 of the printer 51 (step S51). If it is YES at step S51, i.e., the option detection unit 305 detects that the option unit 33 has been attached to the printer 51, as the electrical contact points 153 and 154 are in contact, electric power is supplied from the printer to the ID ROM 34 via the power-supply terminal 153A (step S52). Next, the ID-ROM controller 31 issues an output instruction to output the content of the ID ROM 34, via the control terminal 153C, to the ID ROM 34. The ID ROM 34 outputs a pre-stored device ID to the controller 8 via the output terminal 153B (step S53).

On the other hand, if it is determined at step S51 that the option unit 33 is not attached to the printer 51 when or after the power of the printer 51 has been turned on, as a device ID can not be read, it is determined that the option unit 33 is not attached to the printer 51. Then the device ID of the printer 51 itself is read from the ID ROM 32 and transferred to the controller 8. The above processing is repeated at predetermined periods.

On the printer side, device-ID selection, to be described later, is performed when the power of the printer is turned on, or when polling at a predetermined intervals by the host computer is performed, or the status of the printer is changed (including a case where an optional device has been attached/detached to/from the printer). When a device-ID request has been made by the host computer, a response is made immediately. It may also be arranged such that a device ID is obtained (recognized) and a response is made with the device ID after the device-ID request has been received.

As described above, according to the second embodiment, since a device ID can be freely set by each option unit, more option units, in comparison with the first embodiment, can be used in printing without any change of settings in the printer.

Especially, even when an option unit, which was not taken into consideration upon designing the printer, is connected to the printer, if the option unit has an ID ROM and if an appropriate printer driver is installed into the host computer in advance, the appropriate printer can be selected by reading a device ID from the ID ROM. This enables printing corresponding a variety of option units.

Note that the device-ID reading and printer-driver selection on the host computer side are the same as those in the first embodiment, therefore the explanation of these processings will be omitted. In this case, the host computer 100 must have printer drivers corresponding to the device IDs stored in the ID ROM 32 in the printer and stored in the ID ROM 33 in the option units.

As described above, according to the embodiments, the device ID of the printer is changed on the printer side, in correspondence with an optional device attached to the printer, and the device ID is discriminated on the host computer side. Thus, a printer driver corresponding to the optional device attached to the printer can be appropriately supported for printing. Further, if a currently operative printer driver is inappropriate, printing is not performed, and a warning message is displayed to inform an operator that printing is impossible. This prevents printing using an inappropriate printer driver, thus avoiding printing error, and further, prevents various inconveniences occur in the host computer and the printer, caused by printing with inappropriate printer driver.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

Figure 10:
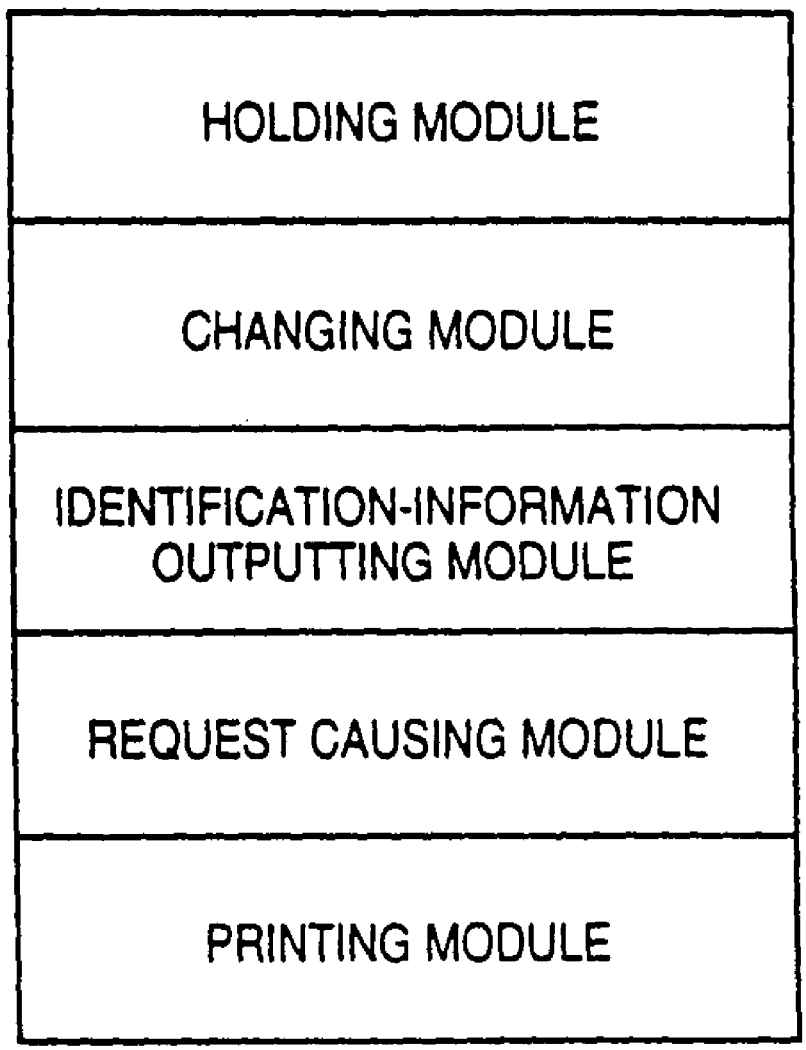
FIG. 10 is an example of a memory map of the printer of the present invention.

In a case where the present invention is applied to the aforesaid storage medium, the storage medium stores program codes corresponding to the flowcharts described in the embodiments. Briefly, the storage medium stores each module shown as an example of a memory map in FIG. 10. More specifically, program codes which correspond to holding module (holding a device ID which the host computer can discriminate), changing module (changing the device ID when the power of the printer is turned on, or it is detected by polling with a predetermined period from the host computer that an optional device has been attached to the printer, in accordance with a request from the host computer), identification-information outputting module (causing the host computer to require a device ID when the optional device has been attached to the printer), request causing module (causing the host computer to make device-ID request when the optional device has been attached to the printer) and printing module (performing printing based on print information inputted from the host computer), at least, are to be stored in the storage medium.

As described above, the present invention provides an information processing apparatus which performs appropriate control corresponding to option-device setting (attached or not) status of a printer connected to the apparatus.

Further, it is arranged such that an option unit has identification information on the type of the optional device so that the identification information can be outputted to the information processing apparatus when the optional device is attached to the printer. In this case, even when an option unit, which was not been taken into consideration upon designing the printer, is connected to the printer, printing can be performed by changing the printer driver in the information processing apparatus in accordance with the identification information obtained from the optional device. This enables to connect various option units to the printer.

Further, in the information processing apparatus, it is determined whether or not a currently control program for controlling the printer is appropriate, in accordance with the identification information from the printer. If the control program is inappropriate, an appropriate control program is selected based on the identification information and printing can be performed. Further, even if the information processing apparatus does not have an appropriate control program, printing by using an inappropriate control program can be prevented, thus avoiding undesired print result.

As many apparently widely different embodiments of the present invention can be made without departing from the spirit and scope thereof, it is to be understood that the invention is not limited to the specific embodiments thereof except as defined in the appended claims.

What is claimed is:

1. A printer configured to receive print information from an information processing apparatus connected to said printer via an interface and to perform print processing based on the print information and comprising:
   detecting means for detecting whether or not an optional device is attached to said printer;
   selecting means for selecting, in accordance with a detection result of said detecting means, first identification information related to the printer or second identification information representing data related to said optional device; and
   identification information output means for transferring, the identification information as selected by said selecting means to said information processing apparatus in response to a received request from the information processing apparatus,
   wherein said detecting means is configured to repeat detection as to whether or not an optional device is attached to said printer at predetermined intervals after power on,
   wherein said selecting means selects the first identification information related to the printer if said detecting means does not detect the optional device or selects the second identification information representing data related to said optional device if said detecting means detected the optional device, and
   wherein the identification information selected by said selecting means and transferred to said information processing apparatus is used by the information processing apparatus to select a device driver.

2. The printer according to claim 1 and configured, when said detecting means detects that an optional device has been attached to said printer, to recognize a barcode identifying said optional device, said selecting means selecting the second identification information in accordance with a recognized barcode.

3. The printer according to claim 1, wherein said selecting means is configured to obtain the second identification information from a ROM provided in the attached optional device.

4. The printer according to claim 1, and configured to mount an optional device which can be any one of the following: an automatic document feeder, a sorter, a double-sided printing unit, a paper cassette, a finisher or a scanner.

5. The printer according to claim 1 in combination with an information processing apparatus, wherein said information processing apparatus is configured to select a printer driver in accordance with the first or second identification information outputted from said printer.

6. A method of controlling a printer including receiving print information from an information processing apparatus connected to said printer via an interface and to perform print processing based on the print information and comprising the steps of:
    detecting whether or not an optional device is attached to said printer;
    selecting, in accordance with a detection result in said detecting step, first identification information related to the printer or second identification information representing data related to said optional device; and
    transferring, the identification information as selected in said selecting step to said information processing apparatus in response to a received request from the information processing apparatus,
    wherein said detecting step is repeated at predetermined intervals after power on,
    wherein said selection step comprises selecting first identification information related to the printer if the optional device is not detected or selecting second identification information representing data related to said optional device if the optional device is detected, and
    wherein the identification information selected in said selection step and transferred to said information processing apparatus being used by the information processing apparatus to select a device driver.

7. The method according to claim 6, further comprising recognizing a barcode corresponding to an optional device when the optional device is connected to the printer, recognition of the barcode causing the selecting step to select the second identification information for transmission to the information processing apparatus.

8. The method according to claim 6, wherein in said selection step, the second identification information is obtained from a ROM provided in the attached optional device.

9. The method according to claim 6, wherein said information processing apparatus selects a printer driver in accordance with the first or second identification information outputted from said printer.

10. A computer-readable storage medium storing processor implementable instructions for implementing the method of claim 6.

11. A printer configured to receive print information from an information processing apparatus connected to said printer via an interface and to perform print processing based on the print information and comprising:
    detecting means for detecting whether or not an optional device is attached to said printer;
    selecting means for selecting, in accordance with a detection result of said detecting means, first identification information related to the printer or second identification information representing data related to said optional device; and
    identification information output means for transferring the identification information as selected by said selecting means to said information processing apparatus in response to a received request from the information processing apparatus,
    wherein said detecting means is configured to repeat detection as to whether or not an optional device is attached to said printer at predetermined intervals after power on,
    wherein said selecting means selects first identification information related to the printer if said detecting means does not detect the optional device or selects second identification information representing data related to said optional device if said detecting means detected the optional device,
    wherein said selecting means further controls a selecting operation of the identification information in response to an input to operate said printer, and
    wherein the identification information selected by said selecting means and transferred to said information processing apparatus is used by the information processing apparatus to select a device driver.

12. A method of controlling a printer including receiving print information from an information processing apparatus connected to said printer via an interface and to perform print processing based on the print information and comprising the steps of:
    detecting whether or not an optional device is attached to said printer;
    selecting, in accordance with a detection result in said detecting step, first identification information related to the printer or second identification information representing data related to said optional device; and
    transferring the identification information as selected in said selecting step to said information processing apparatus in response to a received request from the information processing apparatus,
    wherein said detecting step is repeated at predetermined intervals after power on,
    wherein said selection step comprises selecting first identification information related to the printer if the optional device is not detected or selecting second identification information representing data related to said optional device if the optional device is detected or in response to operator input via a control panel,
    wherein further said selection step comprises controlling a selecting operation of the identification information in response to an input to operate said printer, and
    wherein the identification information selected in said selection step and transferred to said information processing apparatus is used by the information processing apparatus to select a device driver.

13. A computer-readable storage medium storing processor implementable instructions for implementing the method of claim 12.

14. A printer adapted to receive print information from an information processing apparatus connected to said printer via an interface and to perform print processing based on the print information, said printer comprising:
    detecting means for detecting whether or not an optional device is attached to said printer;
    selecting means for selecting, in accordance with a detection result of said detecting means, first identification information corresponding to the printer or second identification information representing data corresponding to said optional device wherein said first identification information and said second identification information include model information; and
    identification information output means for transferring the identification information as selected by said selecting means to said information processing apparatus,
    wherein said selecting means selects the first identification information corresponding to the printer if said detecting means does not detect the optional device, or selects the second identification information representing data corresponding to said optional device if said detecting means detects the optional device, and wherein the identification information selected by said selecting means and transferred to said information processing apparatus is used by the information processing apparatus to select a device driver.

15. The printer according to claim 14, wherein said optional device is at least any one of an automatic document feeder, a sorter, a double-sided printing unit, a paper cassette, a finisher and a scanner.

16. The printer according to claim 14, wherein the second identification information representing data corresponding to said optional device includes at least the model information of the printer with an information relating to the optional device.

17. The printer according to claim 14, wherein both of the first identification information corresponding to the printer and the second identification information representing data corresponding to said optional device include at least model information of the printer which is different from each other.

18. A control method for a printer adapted to receive print information from an information processing apparatus connected to said printer via an interface and to perform print processing based on the print information, said method comprising:

a detecting step for detecting whether or not an optional device is attached to said printer;

a selecting step for selecting, in accordance with a detection result in said detecting step, first identification information corresponding to the printer or second identification information representing data corresponding to originated from said optional device wherein said first identification information and said second identification information include model information; and an identification information output step for transferring the identification information as selected in said selecting step to said information processing apparatus, wherein, in said selecting step, the first identification information corresponding to the printer is selected if the optional device is not detected in said detecting step, and the second identification information representing data corresponding to said optional device is selected if the optional device is detected, and wherein the identification information selected in said selecting step and transferred to said information processing apparatus is used by the information processing apparatus to select a device driver.

19. The control method for the printer according to claim 18, wherein said optional device is at least any one of an automatic document feeder, a sorter, a double-sided printing unit, a paper cassette, a finisher and a scanner.

20. The control method for the printer according to claim 18, wherein the second identification information representing data corresponding to said optional device includes at least the model information of the printer with an information relating to the optional device.

21. The control method for the printer according to claim 18, wherein both of the first identification information corresponding to the printer and the second identification information representing data corresponding to said optional device include at least model information of the printer which is different from each other.

22. A computer-readable storage medium storing a computer program that causes a computer to execute a control method for a printer adapted to receive print information from an information processing apparatus connected to said printer via an interface and to perform print processing based on the print information, said method comprising:

a detecting step for detecting whether or not an optional device is attached to said printer;

a selecting step for selecting, in accordance with a detection result in said detecting step, first identification information corresponding to the printer or second identification information representing data corresponding to said optional device wherein said first identification information and said second identification information include model information; and an identification information output step for transferring the identification information as selected in said selecting step to said information processing apparatus, wherein, in said selecting step, the first identification information corresponding to the printer is selected if the optional device is not detected in said detecting step, and the second identification information representing data corresponding to said optional device is selected if the optional device is detected, and wherein the identification information selected in said selecting step and transferred to said information processing apparatus is used by the information processing apparatus to select a device driver.

* * * * *